United States Patent [19]
Hasegawa et al.

[11] Patent Number: 5,767,998
[45] Date of Patent: Jun. 16, 1998

[54] WAVELENGTH-DIVISION MULTIPLEXED COMMUNICATION SYSTEM UTILIZING OPTICAL SOLITONS

[75] Inventors: Akira Hasegawa, Kyoto; Yuji Kodama, Mukou, both of Japan

[73] Assignee: Research Development Corporation of Japan, Japan

[21] Appl. No.: 681,963

[22] Filed: Jul. 30, 1996

[30] Foreign Application Priority Data

Sep. 13, 1995 [JP] Japan ................... 7-235168

[51] Int. Cl.⁶ .......................... H04B 10/00; H04J 14/02
[52] U.S. Cl. ...................... 359/161; 359/124; 359/134
[58] Field of Search ..................... 359/134, 160–161, 359/188, 179, 173, 124

[56] References Cited

U.S. PATENT DOCUMENTS

| | | | |
|---|---|---|---|
| 5,471,333 | 11/1995 | Taga et al. | 359/173 |
| 5,574,590 | 11/1996 | Edagawa et al. | 359/179 |
| 5,629,795 | 5/1997 | Suzuki et al. | 359/161 |

OTHER PUBLICATIONS

Golorchenko et al., "Collision–Induced Timing Jitter Reduction by Periodic Dispersion Management in Soliton WDM Transmission", Electronics Letters, 1997.
Kumar et al., "Optimal Dispersion Management Schemes for WDM Soliton Systems", Electronics Letters, vol. 33, No. 6, Mar. 13, 1997 pp. 459–461.
Matsuzono et al., "Transmission Characteristics Improvement of Two–Channel WDM Solitons by Controlling Initial Time Offset" Leos '96.
Optics Letters, vol. 15, No. 24, Dec. 15, 1990, p. 1443.
Physical Review Ltrs, vol. 66, No. 2, Jan. 14, 1991 p. 161.
IEEE Journal of Quantum Elec. vol. 26, No. 12, Dec. 1990, p. 2095.
IEEE Jor of Lightwave Tech., vol. 9, No. 2, Feb. 1991, p. 194.
Optics Letters vol. 7, No. 7, Jul. 1982, p. 339.
IEEE Jor. of Lightwave Tech., vol. 9, No. 2, Feb. 1991, p. 228.
Optics Letters, vol. 15, #21, Nov. 1, 1990, p. 1200.
Optics Letters, vol. 16, #18, Sep. 15, 1991, p. 1385.
Optics Letters, vol. 12, #1, Jan. 1987, p. 54.
Solutions in Optical Communications, Oxford Univ. Press, 1995.
Optics Letters, vol. 20, No. 7, Apr. 1, 1995, p. 701.

Primary Examiner—Kinfe-Michael Negash
Attorney, Agent, or Firm—Lorusso & Loud

[57] ABSTRACT

In a wavelength-division multiplexed communication system utilizing optical solitons in which optical amplifiers are inserted into an optical fiber at predetermined intervals so as to compensate for loss in the fiber, the group-velocity dispersion of the optical fiber is varied at positions where the optical amplifiers are provided as well as in regions between the optical amplifiers, so as to eliminate dispersive waves generated by the solitons, thereby eliminating disturbance due to soliton collision. This prevents time shifts due to soliton collision in different wavelength channels in a wavelength multiplex system.

8 Claims, 4 Drawing Sheets

F I G. 5
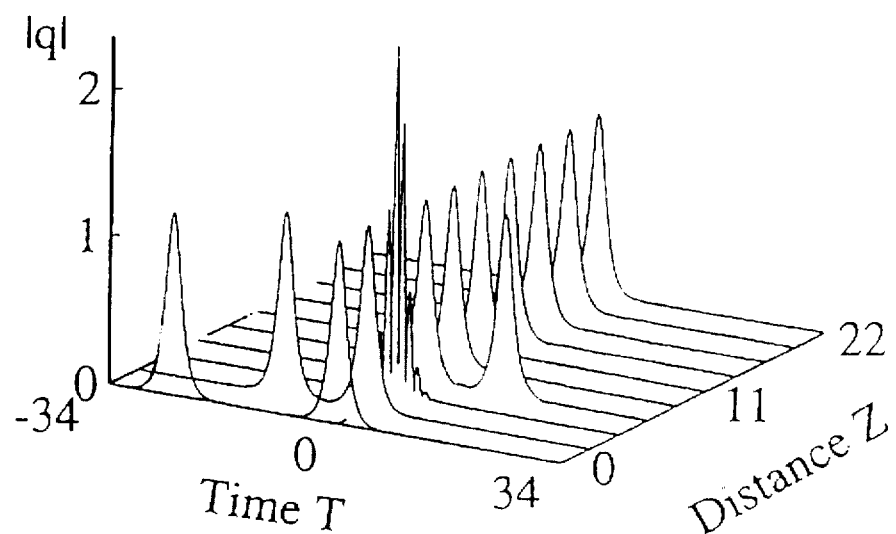
F I G. 6
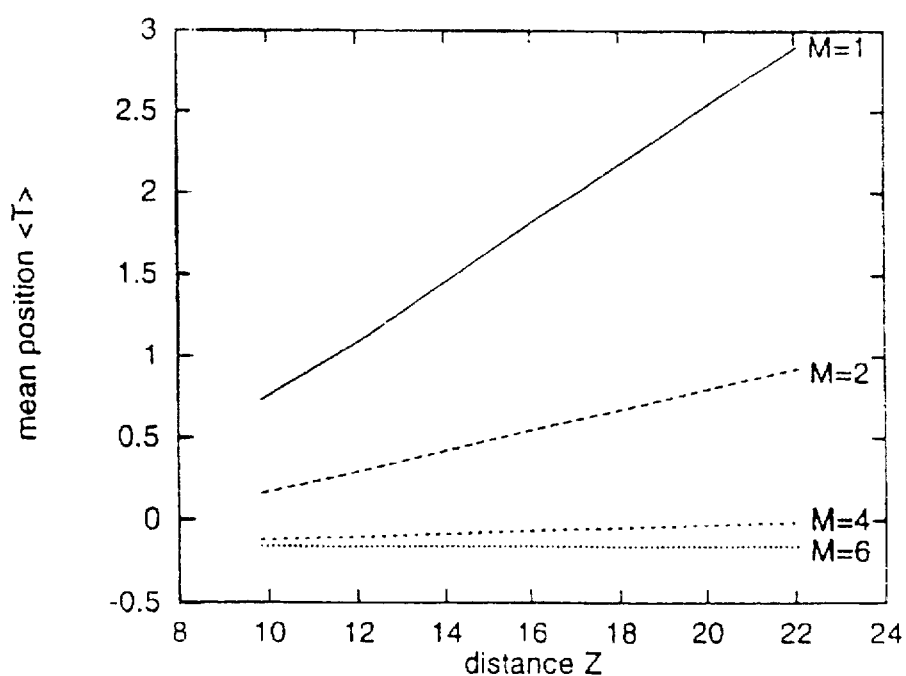

1
WAVELENGTH-DIVISION MULTIPLEXED COMMUNICATION SYSTEM UTILIZING OPTICAL SOLITONS

BACKGROUND OF THE INVENTION

1. Field of the Invention

The present invention concerns with a wavelength-division multiplexed communication system utilizing optical solitons in which optical amplifiers are inserted into an optical fiber at predetermined intervals so as to compensate for loss in the fiber.

2. Description of the Related Art

Conventionally, a method has been proposed to insert optical amplifiers into an optical fiber at predetermined intervals to compensate for loss in the fiber, thereby constructing a fiber transmission line having a reduced overall loss.

FIG. 1 shows the structure of such a conventional communication system.

As shown in FIG. 1, a soliton having a waveform shown in FIG. 1 is injected to the input terminal of an optical fiber 1, so that a soliton having a waveform shown in FIG. 1 is ejected from the output terminal of the optical fiber. In this transmission system, optical amplifiers 2 are inserted into the optical fiber 1 at predetermined intervals so as to compensate for loss in the optical fiber 1.

In this field, techniques disclosed in the following documents are known. (1) A. Hasegawa and Y. Kodama, Opt. Lett. 15, 1443 (1990); Phys. Rev. Lett. 66, 161 (1991). (2) M. Nakazawa, K. Suzuki, H. Kubota, E. Yamada and Y. Kimura, IEEE J. Quantum Electron. 26, 2095 (1990). (3) L. F. Mollenauer, S. G. Evangelides and H. A. Haus, J. Lightwave Tech. 9, 194 (1991). (4) Y. Kodama and A. Hasegawa, Opt. Lett. 7, 339 (1982). (5) J. R. Simpson, H. T. Shang, L. F. Mollenauer, N. A. Olsson, P. C. Becker, K. S. Kranz, P. J. Lemaire and M. J. Neubelt, IEEE J. Lightwave Tech. 9, 228 (1991); M. Nakazawa, Y. Kimura and K. Suzuki, Opt. Lett. 15, 1200 (1990). (6) A. Hasegawa and Y. Kodama, Opt. Lett. 16, 1385 (1991). (7) K. Tajima, Opt. Lett. 12, 54 (1987). (8) A Hasegawa and Y. Kodama, "Solitons in Optical Communications", Oxford University Press, Oxford, (1995). (9) R. Ohhira, A. Hasegawa and Y. Kodama, Opt. Lett. 20, 701 (1995).

In the system as shown in FIG. 1, when solitons of different channels interfere with one another in an optical amplifier, the transmission speeds of the solitons vary, thereby causing time jitters.

To overcome this problem, it is necessary to make the amplifier spacing $Z_n$ sufficiently smaller than the dispersion distance $Z_0$ of pulses.

However, since the dispersion distance of solitons is proportional to the square of the pulse width of the solitons, the dispersion distance becomes short when solitons having a very small pulse width are used. In this case, a great number of amplifiers are needed when the amplifier spacing is determined so as to satisfy the above-described conditions. Therefore, the conventional system is not practical for solitons having a relatively small pulse width. However, since the pulse width of solitons is inversely proportional to the communication speed, solitons having a narrower pulse width are needed so as to increase the communication speed. In this case, the dispersion distance decreases, so that the problem of time jitters cannot be avoided when using the conventional method unless the amplifier spacing is decreased considerably.

2
SUMMARY OF THE INVENTION

An object of the present invention is to solve the above-mentioned problems and to provide a wavelength-division multiplexed communication system utilizing optical solitons which can avoid the problem of time jitters resulting from soliton collisions, without decreasing the spacing between optical amplifiers.

To achieve the above object, the present invention provides a wavelength-division multiplexed communication system utilizing optical solitons in which optical amplifiers are inserted into an optical fiber at predetermined intervals so as to compensate for loss in the fiber. In this system, the group-velocity dispersion of the optical fiber is made to vary at positions where the optical amplifiers are provided as well as in the regions between the optical amplifiers, so as to eliminate dispersive waves generated by the solitons, thereby eliminating disturbance due to collision among the solitons.

Accordingly, a little time shift occurs in the soliton of each wavelength, so that the wavelength-division multiplexed communication can be performed highly reliably.

Preferably, the group-velocity dispersion is increased stepwise at each position where each of the optical amplifier is located in proportion to the increase of the soliton power and is decreased exponentially in proportion to the soliton power in a succeeding region between the optical amplifiers.

Since disturbance due to soliton collision in lumped optical amplifiers is eliminated, a time shift due to collision in the amplifiers is not produced. As a result, problems caused by lumped optical amplifiers such as EDFAs ($Er^{3+}$ doped fiber amplifiers) can be completely solved.

In practical case, the dispersion may be decreased exponentially in approximation. This facilitates the design and construction of the system.

Preferably, optical fibers having different group-velocity dispersions are connected successively in series so as to increase the group-velocity dispersion stepwise at each position where each of the optical amplifiers is provided and to decrease the group-velocity dispersion substantially exponentially in a piece-wire fashion in a succeeding region between the optical amplifiers.

The larger the number of optical fibers to be connected between two optical amplifiers, the less the time jitter results. The number of optical fibers is determined so that the time jitter is reduced to a tolerable level.

As described above, without shortening the amplifier spacing, disturbance due to soliton collision can be eliminated by connecting a number of optical fibers, each having a constant dispersion, such that the overall variation of the dispersion approaches the ideal variation (indicated by broken lines in FIG. 2). Since this system can be constructed by simply connecting optical fibers having pre-designated dispersions, the construction of the system is easy.

BRIEF DESCRIPTION OF THE DRAWINGS

FIG. 5 is a diagram corresponding to FIG. 4 for the case where dispersion management is performed, and fiber sections (M=4) are equally spaced in Z' coordinate;

FIG. 6 is a graph showing variations in the mean positions of faster solitons as a function of a transmission distance, in which M is a parameter and fiber sections are equally spaced in Z'.

DETAILED DESCRIPTION OF THE PREFERRED EMBODIMENT

Figure 1:
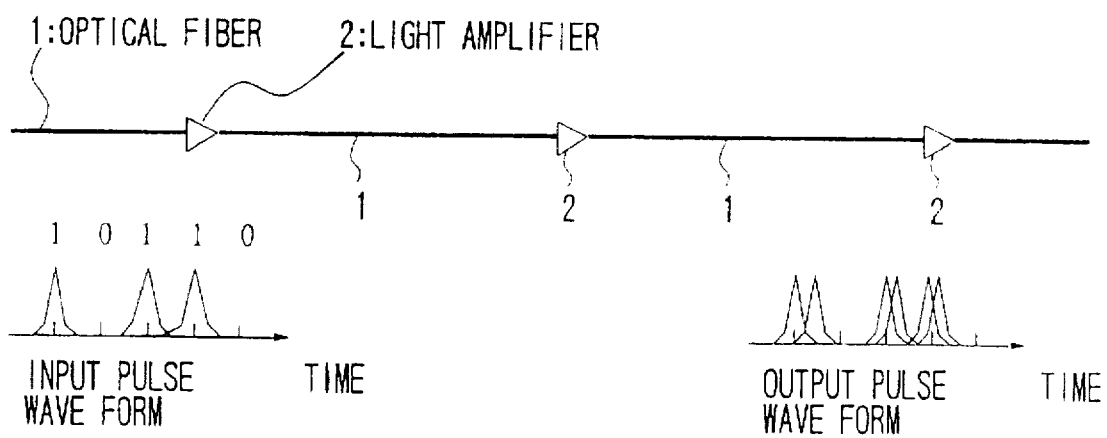
FIG. 1 is a diagram showing the structure of a conventional communication system utilizing solitons.

An embodiment of the present invention will now be described with reference to the accompanying drawings.

In a soliton-based wavelength-division multiplexed communication system having lumped amplifiers, collisions among solitons of respective channels in amplifiers result in a permanent frequency shift of solitons, which causes unacceptably large jitters in pulse arrival times. If, however, the amplifier spacing is made much shorter than the collision distance (the distance over which solitons of two channels propagate in an overlapped state), the influence of collision in the lumped amplifiers is averaged out, and the frequency shift becomes negligibly small. From a realistic designing point of view, it is desirable to make the amplifier spacing longer than the loss distance (the distance over which the amplitudes of solitons decrease by about fifty percent due to fiber loss). In this case, the amplifier spacing becomes comparable to or longer than the collision distance.

The present invention provides a dispersion-management scheme for reducing the frequency shift, even when the amplifier spacing is comparable to or longer than the collision distance.

The normalized amplitude u of the light-wave envelope q[=$a_1$(Z)u] in a fiber having loss Γ compensated for by lumped amplifiers placed at Z=$nZ_a$, (n=0,1,2 ...) satisfies $$i\frac{\partial u}{\partial Z} + \frac{1}{2}\frac{\partial^2 u}{\partial T^2} + \frac{a_1^2(Z)}{d(Z)}|u|^2 u = 0. \tag{1}$$

Here $a_1$(Z) is given by $$a_1(Z) = a_1(0)\exp[-\Gamma(Z-nZ_a)], nZ_a < Z < (n+1)Z_a, \tag{2}$$

with $a_1$(0) defined as $$a_1(0) = \left[\frac{2\Gamma Z_a}{1-\exp(-2\Gamma Z_a)}\right]^{1/2}. \tag{3}$$

d(Z) is the group-velocity dispersion of fiber taken as a function of Z, and Z' is the inhomogeneous distance along the fiber, defined as $$Z' = \int_0^Z d(Z)dZ \tag{4}$$

It is clear from Eq.(1) that the amplitude u satisfies the ideal nonlinear Schrödinger equation if d(Z) is chosen to be proportional to $a_1^2$(Z) in any position; thus ideal transmission is guaranteed, even in a system having lumped amplifiers. That is, at amplifiers, there will be no radiation of non-soliton components or collision-induced frequency shifts.

Although an attempt has been made to manufacture a fiber having continuously decreasing dispersion, there has been no attempt to fabricate a fiber having a precise dispersion variation given by $a_1^2$(Z). When $Z_a$ is designed to be sufficiently large, Γ$Z_a$ may become much larger than unity. Therefore, it is difficult to manufacture a fiber having such a dispersion variation over a long distance.

Consequently, a fiber is considered which has stepwise decreasing dispersion in M steps between amplifiers. Then, Eq.(1) can be rewritten as follows:

$$i\frac{\partial u}{\partial Z} + \frac{1}{2}\frac{\partial^2 u}{\partial T^2} + a_M^2(Z)|u|^2 u = 0, \tag{5}$$

where $a_M^2(Z)[=a_1^2(Z)/d(Z)]$ is a stepwise function defined below. We note, however, that if Z=Z' and the stepwise dispersion is chosen so that it represents the average value of $a_1^2$(Z) between $mZ_a/M < Z < (m+1)Z_a/M$, m=0,1,2, 3 ... ,Eq. (5) corresponds exactly to a system having amplifier spacing decreased to $Z_a$/M, but with a constant dispersion between the amplifiers.

We now consider the frequency shift ΔK(Z) of a soliton in one channel induced by a collision with another channel having a frequency separation given by ΔB. The total frequency shift at Z=∞ due to a collision may be obtained using the adiabatic perturbation technique:

$$\Delta K(\infty) = \frac{1}{\Delta B}\int_{-\infty}^{\infty} dZ \frac{da_M^2(Z)}{dZ} \times \tag{6}$$

$$\int_{-\infty}^{\infty} \text{sech}\left(T+\frac{\Delta BZ}{2}\right)\text{sech}\left(T-\frac{\Delta BZ}{2}\right)dT$$

$$= Im\left\{\frac{32}{\pi^2}\sum_{n=1}^{\infty}\frac{Z_a B_n}{2\pi n}\frac{(\pi^2 n/Z_a\Delta B)^4}{[\sinh(\pi^2 n/Z_a\Delta B)]^2}\right\},$$

where $$B_n = \frac{1}{Z_a}\int_0^{Z_a} dZ a_1^2(Z)\exp\left(-\frac{2\pi n i Z}{Z_a}\right). \tag{7}$$

Note here that, if we choose d(Z)=$a_1^2$(Z), $B_n$ vanishes, except at $B_0$(=1), and therefore ΔK(∞)=0 (ideal dispersion management). In this case, no frequency shift due to soliton collision occurs. Dividing the fiber between two adjacent amplifiers into M fiber sections of equal length $Z_a$/M having constant dispersion produces subharmonics having a period $Z_a$ (i.e., spatial frequency components are multiples of 2π/$Z_a$), in addition to the dominant period of $Z_a$/M. If we choose fiber sections such that they are of equal length, $Z_a$/M in Z' coordinate, reduction of the subharmonic components having period $Z_a$ can be achieved. We thus propose to choose the length $Z_l$ and dispersion $D_l$ of the M-th section of the fiber such that $$Z'(Z_{l+1})-Z'(Z_l)=Z_a/M, l=0, 1, \ldots M-1 \tag{8}$$

Using Eq.(8), and taking $D_l$ to provide dispersion corresponding to the average of the ideal dispersion $$D_l = \frac{1}{Z_{l+1}-Z_l}\int_{Z_l}^{Z_{l+1}} a_1^2(0)\exp(-2\Gamma Z)dZ, \tag{9}$$

we find $Z_l$ i and $D_l$ to be $$Z_l = -\frac{1}{2\Gamma} \ln \left\{ 1 - \frac{I[1-\exp(-2\Gamma Z_a)]}{M} \right\}, \quad (10)$$

$$D_l = \frac{Z_a}{M(Z_{l+1} - Z_l)}. \quad (11)$$

Figure 2:
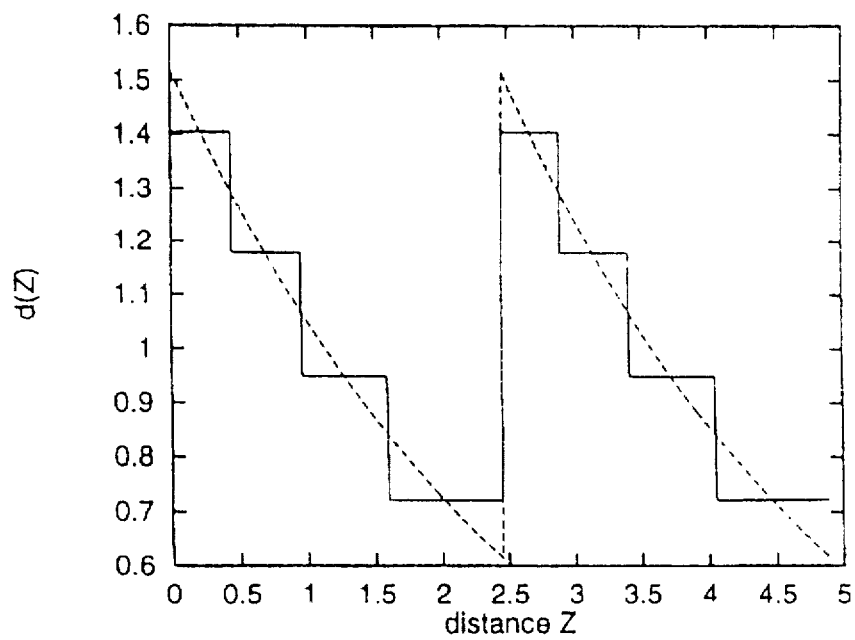
FIG. 2 is a diagram showing a stepwise dispersion profile (solid curves) of fiber sections equally spaced in Z' coordinate (see Eq. (4)) and an ideal exponential dispersion profile (dashed curves)

FIG. 2 shows the profile of d(Z) and the fiber length of each section for M=4. Using Eqs.(9) and (10), we find the Fourier coefficient $B_n$ to be $$B_n = \frac{a_1^2(0)}{2M} \exp(-i\pi n/M) \sum_{m=0}^{M-1} \exp(-i2\pi nm/M) \times \quad (12)$$

$$\frac{[2i(M-m\alpha)\sin(n\pi/M)] + \alpha\exp(-i\pi n/M)}{\Gamma Z_a + i\pi n D_m}$$

where $\alpha=1-\exp(-2\Gamma Z_a)$. From Eq.(12), we note that $B_n$ has a dominant peak at n=M, indicating that subharmonic components having period $Z_a$ are reduced.

Figure 3:
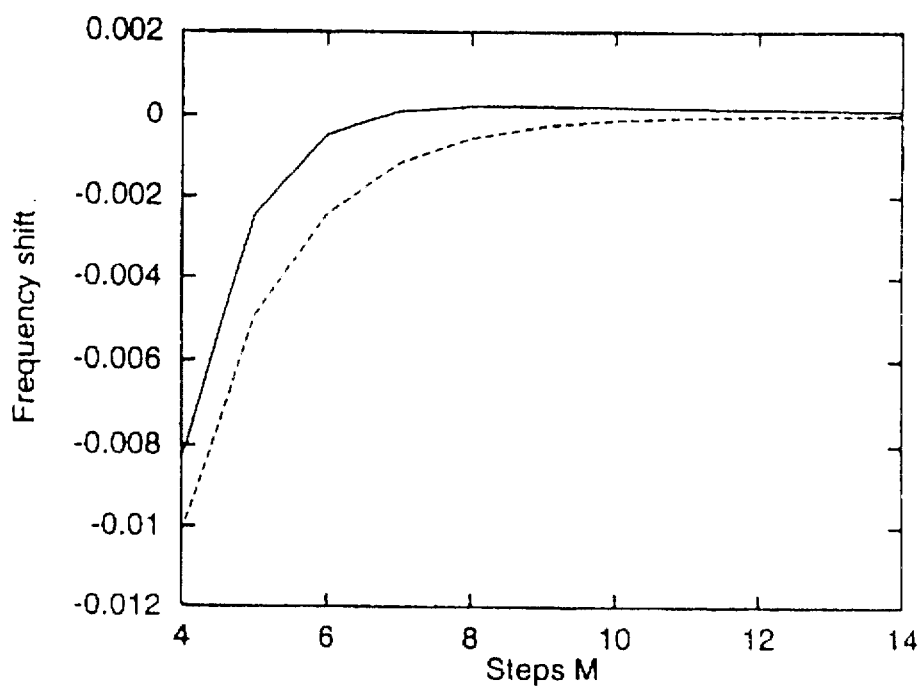
FIG. 3 is a diagram showing the relationship between frequency shift $\Delta K(\infty)$ and the number of steps M for the case of fiber sections equally spaced in Z' coordinate (solid curve) and in Z coordinate (dashed curve)

The present inventors have numerically evaluated the total frequency shift $\Delta K(\infty)$ using Eq.(6), for various values of the number of steps M between amplifiers for the case in which the fiber is divided into equal lengths in both Z (real distance) and Z'[where Zl is given by Eq.(10)] for the choice of $Z_a$=2.45, $\Gamma$=0.185, and $\Delta B$=5. FIG. 3 shows the result. As can be seen from FIG. 3, if the fiber sections are of equal length in Z', for M larger than 6, $\Delta K(\infty)$ is practically reduced to zero.

Numerical simulations were carried out using the following parameters of the fiber: wavelength 1.56 μm; pulse width 5 ps; loss rate of the fiber $\Gamma$=0.0461 km$^{-1}$(0.2 dB/km); dispersion k"=1 ps$^2$/km, which corresponds to the dispersion distance $Z_0$=8.16 km; effective fiber cross section=25 μm$^2$; nonlinear coefficient $n_2$=3.18×10$^{-16}$cm$^2$/W; and amplifier spacing $Z_a$=20 km. In the calculation, amplifier noise and higher-order terms in the nonlinear Schrödinger equation are neglected.

Figure 4:
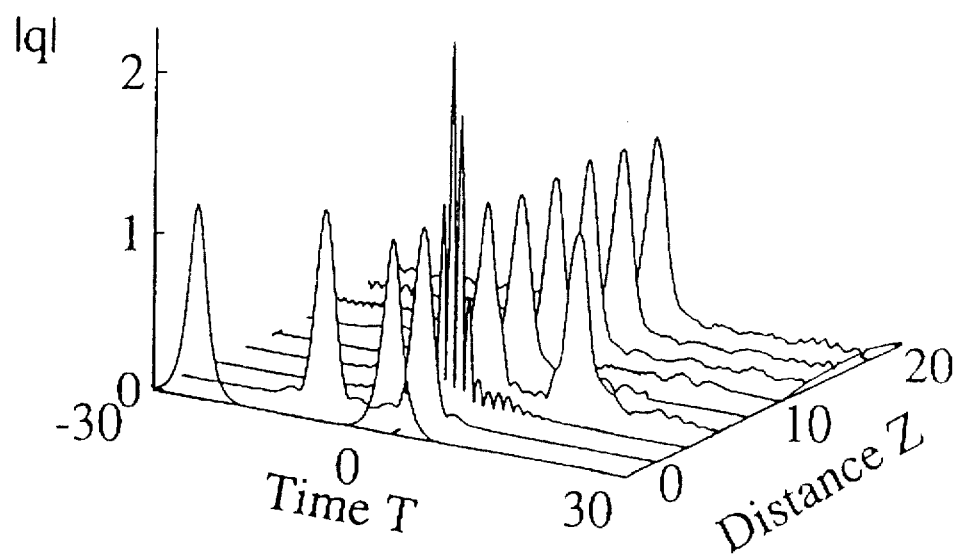
FIG. 4 is a diagram showing the absolute amplitude |q| as a function of transmission distance Z and time T for the case where no dispersion management is performed, wherein the slower soliton is artificially removed at Z=9.8.

FIG. 4 shows soliton collision when no dispersion management is performed. Here, as well as in FIG. 5, the slower soliton is artificially removed at Z=9.8 to show the behavior of the faster soliton more clearly. Because of periodic amplifications, dispersive waves are emitted by solitons. In addition, a collision-induced shift of the soliton's mean position can be seen.

FIG. 5 shows the soliton collision when four fiber sections are provided between two adjacent amplifiers using fiber lengths and dispersion as given by Eqs.(10) and (11). As can be seen, both radiation- and collision-induced temporal shifts of the soliton are reduced.

FIG. 6 is a graph showing the mean positions <T> of solitons as a function of a transmission distance Z, which are normalized by the dispersion distance over which the step number M is used as a parameter. This graph shows position shifts due to soliton collision. As is apparent from FIG. 6, influence of collision can be reduced to a satisfactory level when M is made to be equal to or greater than 4.

Figure 7:
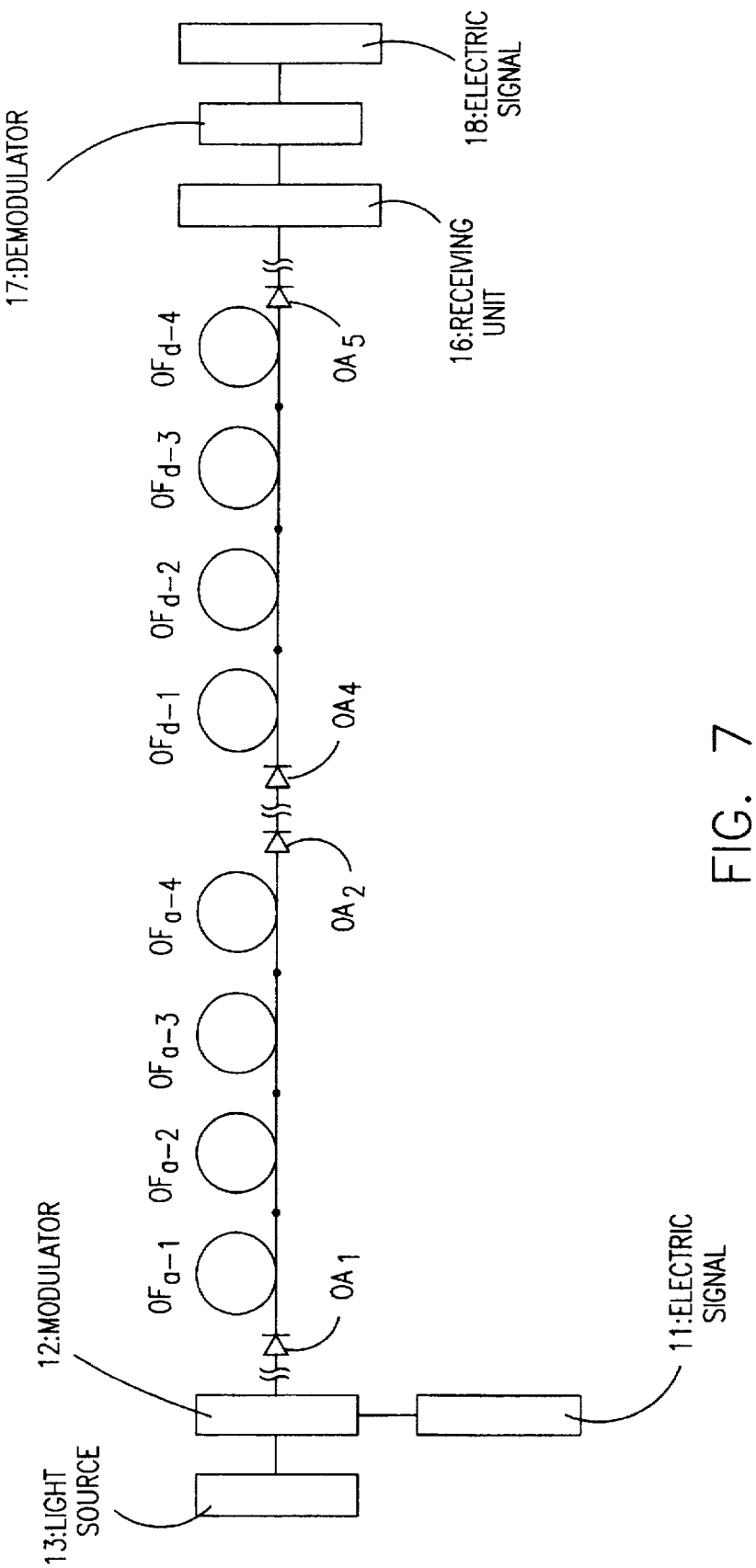
FIG. 7 is diagram showing an example of a system according to an embodiment of the present invention in which the dispersion management according to the present invention shown in FIG. 5 is carried out, and in which the dispersion of the fiber is varied four times (M=4) between two optical amplifiers.

FIG. 7 shows an example of a system according to an embodiment of the present invention in which the dispersion management according to the present invention shown in FIG. 5 is carried out, and in which the dispersion of the fiber is varied four times (M=4) between two optical amplifiers.

In FIG. 7, a light source 13 is modulated by an electric signal 11 to be transmitted by a modulator 12. Solitons irradiated from the modulator 12 are amplified by an optical amplifier $OA_1$ and are transmitted through optical fibers $OF_{a-1}$, $OF_{a-2}$, $OF_{a-3}$, and $OF_{a-4}$ having varying dispersions and constituting the first fiber section. The solitons are then transmitted successively through the second and third fiber sections, and enter an optical amplifier $OA_4$ in which the solitons are amplified. After that, the solitons are transmitted through optical fibers $OF_{d-1}$, $OF_{d-2}$, $OF_{d-3}$, and $OF_{d-4}$ having varying dispersions and constituting a fourth fiber section. The solitons are then passed through an optical amplifier $OA_5$ and are received by a light receiver 16. The received solitons are demodulated by demodulator 17 so as to obtain an electric signal 18 corresponding to the original electric signal 11.

We note that the dispersion-management scheme of the present invention involves only passive elements and therefore is easier to implement than a fiber having distributed gain. If the dispersion-management scheme and the amplifier spacing are designed for a particular pulse width and channel separation, the same transmission link can be used over a wide range of pulse widths and channel separation.

For a choice of $Z_a$>1 (amplifier spacing larger than the dispersion distance), the amplifiers produce not only a large collision-induced shift in soliton position but also a large amount of radiation of non-soliton components. In such a case, the result shown here is accurate for a sufficiently large M, even for $Z_a$>1. It should also be noted that the radiation at lumped amplifiers is also reduced by the use of fiber sections spaced equally in Z' rather than in Z.

The present invention is not limited to the above-described embodiment. Numerous modifications and variations of the present invention are possible in light of the spirit of the present invention, and they are not excluded from the scope of the present invention.

What is claimed is:

1. A wavelength-division multiplexed communication system utilizing optical solitons, the communication system comprising:

an optical fiber having optical amplifiers inserted therein at predetermined intervals so as to compensate for loss in the optical fiber; and means for varying group-velocity dispersion of the optical fiber at positions where the optical amplifiers are provided as well as in regions between the optical amplifiers, so as to eliminate dispersive waves generated by the solitons, and simultaneously eliminating disturbance due to soliton collision.

2. A wavelength-division multiplexed communication system according to claim 1, wherein said group-velocity dispersion of said optical fiber is increased stepwise at each position where each of said optical amplifiers is located and is varied substantially exponentially in a subsequent region between said optical amplifiers.

3. A wavelength-division multiplexed communication system according to claim 1, wherein a number of optical fibers having different group-velocity dispersions are connected successively in series so as to increase the group-velocity dispersion stepwise at each position where each of said optical amplifiers is provided and to decrease the group-velocity dispersion substantially exponentially in a subsequent region between said optical amplifiers.

4. A wavelength-division multiplexed communication system according to claim 2, wherein said dispersion in the regions between said optical amplifiers is varied stepwise to approximate exponential variation.

5. A wavelength-division multiplexed communication system according to claim 3, wherein the number of said plurality of optical fibers is sufficiently large to reduce time jitter to acceptable level.

6. A wavelength-division multiplexed communication system utilizing optical solitons, comprising:

modulating means for modulating a lightwave to obtain a modulated signal;

transmitting means for generating solitons in accordance with the modulated signal;

receiving means for receiving said solitons via a transmission line;

demodulating means for demodulating the solitons to obtain an electric signal corresponding to the original electric signal;

a plurality of optical amplifiers installed into the transmission line at predetermined intervals; and an optical fiber installed between every two adjacent amplifiers so as to constitute said transmission line, said optical fiber having a dispersion which varies exponentially, or approximately exponentially.

7. A wavelength-division multiplexed communication system according to claim 6, wherein said optical fiber consists of a plurality of fiber sections each having a predetermined dispersion.

8. A wavelength-division multiplexed communication system according to claim 7, wherein the number of said fiber sections is sufficiently large to reduce the time jitter to acceptable level.

* * * * *